United States Patent [19]

Isley

[11] 4,095,966
[45] Jun. 20, 1978

[54] AIR CLEANER

[75] Inventor: Walter F. Isley, Grosse Pointe Farms, Mich.

[73] Assignee: Teledyne Industries, Inc., Los Angeles, Calif.

[21] Appl. No.: 736,167

[22] Filed: Oct. 27, 1976

[51] Int. Cl.² .............................................. B01D 19/00
[52] U.S. Cl. ........................................ 55/394; 55/431; 55/461; 55/467; 60/39.09 P; 60/605; 415/121 G
[58] Field of Search ............. 55/459 R, 459 A, 459 B, 55/459 C, 459 D, 460, 461, 467, 431, 392, 393–397, 306; 123/119 C, 119 CF; 209/143; 210/512; 60/39.09 P, 319, 605; 415/121 G, 88, 89; 417/406, 407, 408

[56] References Cited

U.S. PATENT DOCUMENTS

| 2,371,583 | 3/1945 | Lincoln | 55/397 |
|---|---|---|---|
| 2,482,642 | 9/1949 | Sylvan | 55/459 B |
| 2,519,531 | 8/1950 | Worn | 417/84 |
| 2,897,917 | 8/1959 | Hunter | 55/408 |
| 3,099,385 | 7/1963 | Elford | 417/406 |
| 3,273,325 | 9/1966 | Gerhold | 55/405 |
| 3,307,485 | 3/1967 | Logue | 415/89 |
| 3,469,566 | 9/1969 | Wilkinson et al. | 60/317 |
| 3,884,658 | 5/1975 | Roach | 123/119 C |

*Primary Examiner*—Bernard Nozick
*Attorney, Agent, or Firm*—Gifford, Chandler, VanOphem, Sheridan & Sprinkle

[57] ABSTRACT

An air cleaner is provided for use with an engine turbocharger having a housing with an inlet and compressor means contained within the housing. The air cleaner is operatively positioned between the air inlet and the compressor means of the turbocharger and comprises an annulus contained within and spaced from the turbocharger housing so that the annulus defines a semitoroidal fluid passageway between the air inlet and the compressor means of the turbocharger. An annular opening is formed around the outer periphery of the toroidal fluid passageway adjacent its outlet and the annular opening is fluidly coupled with an exhaust system. As an air and solid particle mixture from the air inlet of the turbocharger flows through the semitoroidal fluid passageway, the solid particles migrate to the outer periphery of the passageway due to centrifugal force and, thus, flow through the annular opening and to the exhaust system so that only filtered air is supplied to the turbocharger compressor means.

5 Claims, 3 Drawing Figures

AIR CLEANER

BACKGROUND OF THE INVENTION

1. Field of the Invention

The invention of the present application relates generally to gas-solid separators and, more particularly, to such a gas-solid separator for use on the intake of an engine turbocharger.

2. Description of the Prior Art

Engine turbochargers must, of necessity, include an air cleaner for separating solid particles from the air prior to feeding the air into the engine. Otherwise, the solid particles (e.g., dust) damage the components of the engine, such as the engine pistons and piston rings.

The previously known turbocharger air cleaners typically comprise a precleaner and final filter assembly. In the precleaner a plurality of so-called "cyclone tubes" are disposed within the air inlet of the turbocharger. Entry vanes in the cyclone tubes cause the air to rotate as it passes through the tubes so that, due to centrifugal force, the larger solid particles contained within the air migrate to the outer wall of the cyclone tubes. The core of air in the center of the cyclone tube is relatively clean and this clean air core passes through a smaller diameter central tube through the final filter assembly and to the engine turbocharger. The final filter assembly is of more or less conventional construction and includes a filter media between the precleaner and the engine turbocharger designed to filter the smaller diameter solid particles still remaining in the air.

These previously known engine turbocharger air cleaners, however, suffer many disadvantages unknown to the present invention. One such disadvantage is that the filter media within the final filter assembly must be periodically cleaned or replaced.

A still further disadvantage of these previously known air cleaning systems is that the outer annular layer of solid particle-laden air in the cyclone tubes of the precleaner is channeled out through a dirt discharge passage by means of electric motor driven scavenger air pumps. These electric air pumps, however, can fail which results in the reduction of the air cleaning efficiency of the precleaner.

A still further disadvantage of these previously known turbocharger air cleaners is that such air cleaners are relatively expensive to construct.

SUMMARY OF THE PRESENT INVENTION

The engine turbocharger air cleaner of the present invention overcomes the above-mentioned disadvantages of the previously known turbocharger air cleaners by providing such an air cleaner that is not only relatively inexpensive to construct but which is also maintenance free and enjoys virtually fail-safe operation.

In brief, the turbocharger air cleaner of the present invention comprises an annulus contained within the turbocharger housing which defines a semitoroidal fluid passageway between the turbocharger air inlet and the compressor means within the turbocharger.

An annular opening is formed around the outer periphery of the semitoroidal fluid passageway near its outlet and the annular opening, in turn, fluidly communicates with an exhaust system.

In operation, air is inducted into the air inlet, through the semitorodial fluid passageway and to the compressor means. Due to centrifugal force, however, the solid particles contained within the inducted air migrate to the outer periphery of the semitoroidal fluid passageway and flow through the annular opening and to the exhaust system. Conversely, the clean air along the inner periphery of the semitoroidal fluid passageway flows to the turbocharger compressor means and subsequently to the engine in the conventional fashion.

The exhaust system further comprises a fluid connection between the annular opening around the semitoroidal fluid passageway and the engine exhaust. During engine operation, the exhaust creates a partial vacuum due to the venturi effect so that the solid particle laden air injected into the exhaust system through the annular opening is vacated through the fluid connection and out through the engine exhaust. This means for exhausting the solid particle laden air eliminates the previously known motor driven scavenger pumps and ensures maintenance free and fail safe operation.

BRIEF DESCRIPTION OF THE DRAWINGS

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 1:
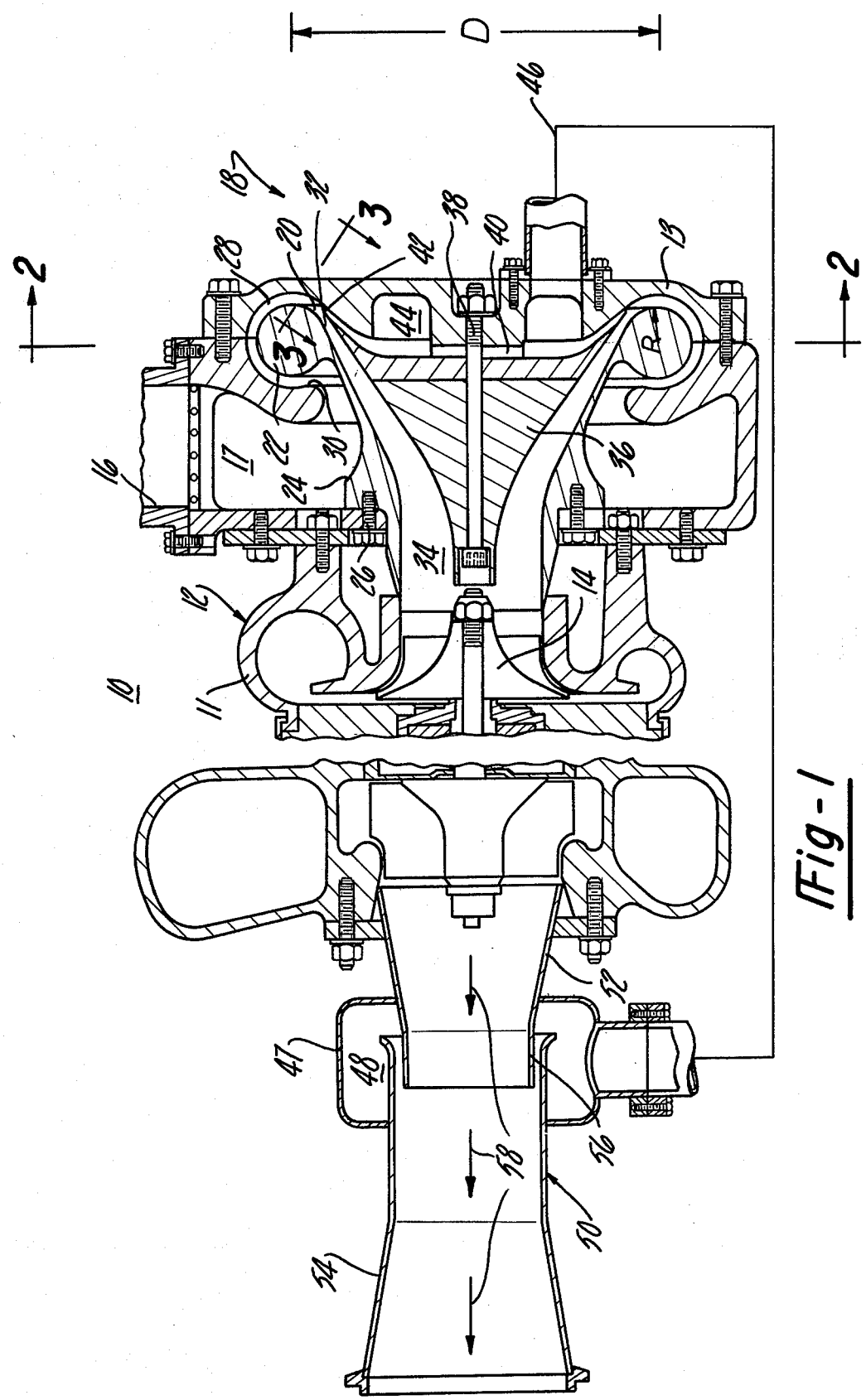
FIG. 1 is a side cross-sectional view showing the engine turbocharger air cleaner of the present invention.
Figure 2:
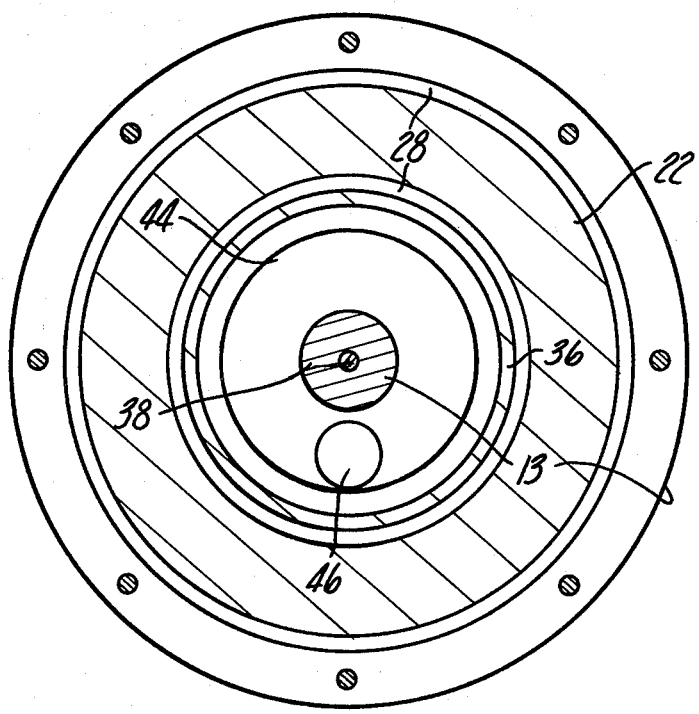
FIG. 2 is a cross-sectional view taken substantially along line 2—2 in FIG. 1.

With reference to FIG. 1, an engine turbocharger 10 is thereshown having a housing 12 comprising a main housing 11 and a back plate 13. Conventional air compressor means 14 and an air inlet 16 are also formed in the housing 12 to supply air to the air compressor means 14.

The air cleaner 18 according to the present invention is operatively disposed between the air inlet 16 forming a chamber 17 and the air compressor means 14 and comprises an annulus 20 having a ring portion 22 and a semiconical portion 24. The annulus 20 is secured to the housing 12 by appropriate fastening means 26 and arranged so that the ring portion 22 is spaced away from the housing 12 and forms a semitoroidal fluid passageway 28 of a predetermined width W between the ring portion 22 and the housing 12. Although any construction can be used, as shown, substantially one half of the outer wall of the passageway 28 is formed by the main housing 11 while the other half is formed by the back plate 13.

The semiconical portion 24 of the annulus 20 is secured across the inner portion of the air inlet chamber 17 so that the entire air flow from the air inlet 16 is deflected by the portion 24 into an inlet 30 of the fluid passage 28. Similarly, the outlet 32 of the fluid passageway 28 communicates through an annular chamber 34 to the air compressor means 14. Preferably a substantially conical member 36 is secured to the back plate 13 of the housing 12 by a bolt 38 within the chamber 34 in order to minimize air flow disturbances between the air cleaner 18 and the air compressor means 14.

Figure 3:
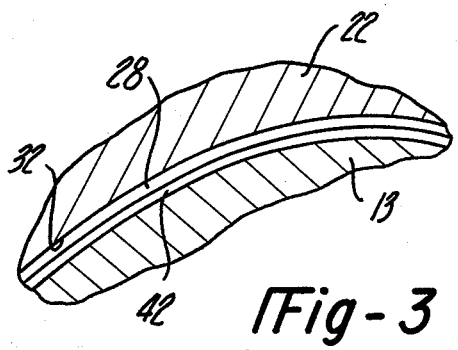
FIG. 3 is a fragmentary sectional view taken substantially along line 3—3 in FIG. 1 and enlarged for clarity.

A spacer 40 is positioned between the back plate 13 and the conical member 36 so that the conical member 36 is spaced away from the back plate 13 by a predetermined distance. This, in turn, forms an annular opening 42, best shown in FIG. 3, around the outer periphery of the semitoroidal fluid passageway 28 near the outlet 32 of the passageway 28.

The engine includes an exhaust system 50 having a first exhaust nozzle 52 which axially extends into a second exhaust nozzle 54 so that the engine exhaust is expelled through the first nozzle 52 and into the second nozzle 54. The second exhaust nozzle 54, however, is of a larger diameter than the first exhaust nozzle 52, thus, forming a narrow annular chamber 56 between the nozzles 52 and 54.

The annular opening 42 adjacent the outlet 32 of the passageway 28 communicates with an annular chamber 44 formed between the housing back plate 13 and the conical member 36. The annular chamber 44, in turn, is fluidly coupled by a fluid conduit 46 to an annular housing 47 forming an annular chamber 48 encircling and in communication with the chamber 56 between the exhaust nozzles 52 and 54.

In operation as an air and solid particle mixture is inducted through the air inlet 16 and into the chamber 17, the portion 24 of the annulus 20 directs the air flow from the chamber 17 and into the semitoroidal fluid passageway 28. As the air-solid particle mixture passes through the passageway 28 at a sufficiently strong air flow (as will be later described), the solid particles contained within the air-solid mixture migrate to the outer periphery of the passageway 28 due to centrifugal force. As the air-solid mixture passes out from the semitoroidal passageway 28, the dust or solid particle laden air along the outer periphery of the passageway 28 flows through the annular opening 42 and into the annular chamber 44 in the end plate 13. Conversely, the clean air along the inner periphery of the passageway 28 bypasses the opening 42 and flows between the portion 24 of the annulus 20 and the conical member 36 to the chamber 34 and, hence, the air compressor means 14.

During engine operation, the engine produces an exhaust flow, indicated by arrows 58, respectively through the exhaust nozzles 52 and 54. Due to the venturi effect, the exhaust flow through the exhaust pipes 52 and 54 creates a partial vacuum in the annular chamber 56 which effectively vacates the solid particle laden air from the annular chamber 44, through the conduit 46, and into the chamber 48. From the chamber 48, the solid particle laden air exhausts through the annular chamber 56 and into the exhaust stream of the engine. This configuration, of course, eliminates the previously known necessity of electric motor driven scavenger pumps for removing or vacating the dust laden air filtrate.

THEORY OF OPERATION

The velocity with which a particle of material migrates through a fluid or gas as a result of centrifugal force is expressed by the forula:

$$V_m = \frac{K_m (d_p)^2 Pa}{18v}$$

Where:

$K_m$ = Stokes-Cunningham correction factor
$a$ = Acceleration ft/sec.² = 32.2 $A_g$ ($A_g$ = Number of g's acceleration)
$d_p$ = Diameter of particle, feet = ($u$/25400 × 12) ($u$ = Diameter of particle, microns)
$P$ = Density of particle, lb/ft³
$v$ = Absolute viscosity of fluid, lb/ft-sec., (1.225 × $10^{-5}$ for air)

By substitution:

$$V_m = \frac{K_m u^2 P A_g \times 32.2 \times 12}{18 \times 1.225 \times 10^{-5} \times (25400 \times 12)^2}$$

$$V_m = \frac{K_m u^2 P A_g}{5.30 \times 10^4} \text{ inches/sec}$$

Acceleration due to rotation is determined by:

$$A_g = (V)^2/2.7R$$

Where:

$A_g$ = Rate of acceleration in g's ($g$ = 32.2 ft/sec.²)
$V$ = Velocity, feet per second
$R$ = Radius of curvature, inches Thus, with the air cleaner 18 of the present invention, separation of a solid particle from the air-solid particle mixture is achieved if, during the time the air travels through the semitoriodal passageway 28, the migration of velocity of a given particle size (or larger particle) is sufficient that the particle will migrate to the outer periphery of the passageway 28 and, thus, pass through the annular opening 42 and to the exhaust system of the engine. The formula for calculation of the required migration velocity for one hundred percent separation of a given particle size from the air-solid particle mixture is:

$$V_m = \frac{W \times \frac{1}{1 + R_s}}{L} \times V,$$

inches per second Where:

$W$ = Width of flow channel, inches
$L$ = Length of flow channel, inches
$V$ = Velocity of fluid flowing in channel, inches per second
$R_s$ = Scavenge Air Ratio

EXAMPLE

Assuming:

Induction air flow rate = 1,000 cubic feet/minute (CFM);
Scavenge air flow ratio $R_s$ = 15%;
Flow velocity V through passageway 28 = 400 feet/second;
Diameter D of the annulus 20 = 10 inches;
Radius R of ring 22 = 1 inch; and
The toroidal passageway extends through an angle of 270° between its inlet 30 and outlet 32.

Then the total air flow (TAF) required through the toroidal passageway = 1,000 + 150 (CFM) so that the area (A) of the toroidal passageway is determined by the equation:

$A$ = TAF/flow velocity = 6.9 sq. inches Then the width W of the toroidal passage is determined by:

$W$ = A/PI D = 0.22 inches while the channel length L is determined by the equation:

$L$ = 2PI R 270/360 = 4.71 inches. The required migration velocity for one hundred percent particle removal is:

$$V_m = \frac{W \times \frac{1}{1+R_s}}{L} \times V = 195 \text{ inches per second}$$

$$A_g = \frac{(400)^2}{2.7 \times 1} = 59{,}260 \text{ g's.}$$

The migration velocity $V_m$ of 195 inches per second along with the acceleration $A_g$ of 59,260 g's can be inserted into the formula:

$$V_m = \frac{K_m u^2 P A_g}{5.30 \times 10^4}$$

to yield a micron diameter size of 1.1 microns. In other words, the air cleaner 18 in the example given will remove all solid particles from the air flow into the turbocharger which are 1.1 microns, or larger, in diameter.

It should be obvious from the foregoing that the required migration velocity of the solid particles can be minimized by both decreasing the width of the semitoroidal fluid passage 28 and/or by increasing the length of the fluid passageway 28. Likewise, other variations of the parameters upon a modification of the engine design in the given example will be apparent to all skilled in the art to which is pertains.

The centrifugal air cleaner 18 of the present invention thus provides a one-step air cleaner for an engine turbocharger which is not only simple but highly effective and efficient in use. Moreover, the air cleaner 18 of the present invention is both relatively inexpensive to construct and, after construction, incurs no maintenance expense whatsoever. Moreover, the air cleaner 18 enjoys virtually fail-safe operation since it requires no moving parts nor any maintenance whatsoever. In addition, the exhaust of the dust laden air channel into the chamber 44 by the venturi vacuum produced at the engine exhaust, eliminates the need for the previously known electric motor driven scavenge pumps.

Having thus described my invention, many modifications thereto will become apparent to those skilled in the art to which it pertains without deviating from the spirit of the invention as defined by the scope of the appended claims.

What is claimed is:

1. An air-solid separator comprising:
    a housing having an air inlet, an air outlet and an annular chamber in fluid communication with both the inlet and outlet,
    an annulus stationarily secured to the housing so that the annulus defines a semitoroidal fluid passageway having a first end open to the air inlet and a second end open to the air outlet wherein said annulus includes a substantially conical portion adapted to deflect the air flow from the air inlet into the semitoroidal passageway,
    said housing having an annular opening around the outer periphery of said semitoroidal fluid passageway adjacent its second end, said opening having one edge which extends radially inwardly into said semitoroidal passageway a predetermined distance,
    a substantially conical member coaxially positioned with said annulus in said housing, the base of said conical member being adjacent to but spaced from said housing said predetermined distance so that the space between the base of the conical member and the housing forms the annular opening while the outer edge of the base forms the inner edge of the annular opening, and
    means connected to the outlet of said housing and positioned downstream from said semitoroidal passageway for inducting fluid flow into said housing inlet, through said semitoroidal passageway and out through said housing outlet whereby the air flow through said semitoroidal passageway exceeds a predetermined velocity so that solid particles suspended in the air from the air inlet centrifugally move to the outer periphery of said semitoroidal fluid passageway and form an annular layer of solid particle laden air having a thickness less than said predetermined distance which flows through said annular opening,
    wherein said air inlet is separated from the air outlet by said conical portion of the annulus so that said air inlet and air outlet are adjacent each other and positioned on the same side of said annulus whereby air flowing from said inlet to said outlet through said semitoroidal passageway must pass around substantially the entire periphery of the annulus before encountering the annular opening.

2. The invention as defined in claim 1 wherein the induction means is an engine turbocharger for an engine and further comprising:
    engine exhaust means for expelling exhaust fumes from the engine, and
    means for fluidly connecting the annular opening with the exhaust means so that the solid particle laden air mixture is expelled from the engine with the exhaust fumes.

3. The invention as defined in claim 2 wherein said exhaust means includes suction means for vacating the solid particle laden air from said opening.

4. The invention as defined in claim 3 wherein said suction means comprises venturi means responsive to the flow of the exhaust fumes through the exhaust means.

5. The invention as defined in claim 4 wherein said venturi means comprises:
    a first exhaust nozzle,
    a second exhaust nozzle upstream from the first nozzle, said second nozzle having a smaller diameter than and inserted into the first nozzle,
    a further housing forming an annular chamber encompassing the junction of the first and second nozzles, and
    fluid connecting means for fluidly coupling said opening to said annular chamber.

* * * * *

UNITED STATES PATENT AND TRADEMARK OFFICE
CERTIFICATE OF CORRECTION

PATENT NO. : 4,095,966

DATED : June 20, 1978

INVENTOR(S) : Walter F. Isley

It is certified that error appears in the above-identified patent and that said Letters Patent are hereby corrected as shown below:

Column 3, line 58, delete "forula" and insert --formula-- therefor;

Column 5, line 28, delete "is" and insert --it--

Signed and Sealed this

Nineteenth Day of December 1978

[SEAL]

Attest:

RUTH C. MASON
Attesting Officer

DONALD W. BANNER
Commissioner of Patents and Trademarks